(12) United States Patent
Yoshida

(10) Patent No.: US 8,067,127 B2
(45) Date of Patent: Nov. 29, 2011

(54) FUEL CELL SYSTEM AND CONTROL METHOD THEREOF FOR DETECTING A CHEMICAL SHORT

(75) Inventor: Naohiro Yoshida, Nisshin (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 1015 days.

(21) Appl. No.: 10/583,413

(22) PCT Filed: Dec. 7, 2004

(86) PCT No.: PCT/IB2004/004004
§ 371 (c)(1),
(2), (4) Date: Jun. 20, 2006

(87) PCT Pub. No.: WO2005/067088
PCT Pub. Date: Jul. 21, 2005

(65) Prior Publication Data
US 2007/0111058 A1    May 17, 2007

(30) Foreign Application Priority Data

Dec. 25, 2003  (JP) .................................. 2003-430689

(51) Int. Cl.
*H01M 8/04* (2006.01)
(52) U.S. Cl. ...................................... 429/444; 429/443
(58) Field of Classification Search .................. None
See application file for complete search history.

(56) References Cited

U.S. PATENT DOCUMENTS

| 6,461,751 B1 | 10/2002 | Boehm et al. | |
|---|---|---|---|
| 2001/0001287 A1* | 5/2001 | Ueno et al. | 429/22 |
| 2003/0224231 A1 | 12/2003 | Penev | |

FOREIGN PATENT DOCUMENTS

| JP | A-61-279071 | 12/1986 |
|---|---|---|
| JP | A-04-004570 | 1/1992 |
| JP | A-04-115467 | 4/1992 |
| JP | A-09-027336 | 1/1997 |
| JP | A-2002-151126 | 5/2002 |
| JP | A-2002-246052 | 8/2002 |
| JP | A-2003-045467 | 2/2003 |
| JP | A-2003-308866 | 10/2003 |
| WO | WO 2004/049488 A2 | 6/2004 |

OTHER PUBLICATIONS

Jan. 8, 2010 Japanese Office Action issued in JP-2003-430689.

* cited by examiner

*Primary Examiner* — Ula C Ruddock
*Assistant Examiner* — Tony Chuo
(74) *Attorney, Agent, or Firm* — Oliff & Berridge, PLC

(57) ABSTRACT

A fuel cell system is provided with a fuel cell (20) which generates electricity by a chemical reaction between a fuel gas supplied to an anode side of the fuel cell and an oxidization gas supplied to a cathode side of the fuel cell; estimating means (50) for estimating whether there is a possibility that a chemical short is occurring in the fuel cell when supply of the fuel gas and the oxidization gas to the fuel cell is stopped; and scavenging means (12) for supplying a scavenging gas to the cathode side when it has been estimated that there is a possibility that the chemical short is occurring.

12 Claims, 6 Drawing Sheets

FUEL CELL SYSTEM AND CONTROL METHOD THEREOF FOR DETECTING A CHEMICAL SHORT

FIELD OF THE INVENTION

The invention relates to a fuel cell system that generates electricity by a chemical reaction between a fuel gas and an oxidization gas, and a control method for that fuel cell system. More particularly, the invention relates to improving the operating efficiency of a fuel cell system.

BACKGROUND OF THE INVENTION

Hydrogen fuel cells generate power through a reaction between hydrogen gas as the fuel gas and oxygen gas as the oxidization gas. Operation of the fuel cell is started by supplying the hydrogen gas to a hydrogen electrode (anode) of the fuel cell while supplying the oxygen gas to an oxygen electrode (cathode), and stopped by stopping the supply of the hydrogen gas and oxygen gas to the fuel cell. When the operation of the fuel cell is stopped with fuel gas and oxidization gas still remaining in the fuel cell, a pressure difference causes the residual gas to move through the electrolyte between the hydrogen electrode and the oxygen electrode, thereby generating a chemical reaction which increases the temperature to a level that may damage the electrolyte (i.e., a chemical short). Because of this, residual gas inside the fuel cell is scavenged by supplying an inert gas inside the fuel cell while it is stopped. Also, as disclosed in JP-A-4-4570, when the fuel cell is in a standby state in which operation thereof is stopped for a relatively short period of time during which power is not supplied from the fuel cell to a load, small amounts of hydrogen gas and oxygen gas continue to be supplied to the fuel cell during this time in order to prevent residual gas from moving through the electrolyte in the fuel cell.

However, when scavenging residual gas using an inert gas when the fuel cell is stopped, not only must the necessary amount of inert gas be stored beforehand, but a scavenging mechanism for scavenging and a tank must be provided separately from the fuel gas/oxidization gas supply system, which is undesirable from the viewpoint of reducing the size as well as the manufacturing costs of the fuel cell. Furthermore, with a construction in which small amounts of hydrogen gas and oxygen gas are continually supplied to the fuel cell and the gases are circulated within the fuel cell even when it is in the standby state, the fuel consumption efficiency decreases due to the fact that auxiliary devices such as a compressor are operating even when power is not being supplied to a load. This is undesirable for obtaining an on-board fuel cell and the like.

DISCLOSURE OF THE INVENTION

In view of the foregoing problems, this invention thus provides a fuel cell system with improved fuel consumption efficiency which prevents a chemical short from occurring or stops a chemical short which is occurring, and a control method for that fuel cell system.

A first aspect of the invention relates to a fuel cell system provided with a fuel cell which generates electricity by a chemical reaction between a fuel gas supplied to an anode side of the fuel cell and an oxidization gas supplied to a cathode side of the fuel cell; estimating means for estimating whether there is a possibility that a chemical short is occurring in the fuel cell when supply of the fuel gas and the oxidization gas to the fuel cell is stopped; and scavenging means for supplying a scavenging gas to the cathode side when it has been estimated that there is a possibility that the chemical short is occurring.

According to this structure, it is estimated whether there is a possibility that a chemical short is occurring when operation of the fuel cell is stopped. When there is a possibility that a chemical short is occurring, a scavenging gas (such as a small amount of air) is supplied for a short time to discharge hydrogen gas that leaked from the anode side to the cathode side outside of the fuel cell. As a result, it is possible to prevent a chemical short from occurring or stop a chemical short which is occurring. Also, because the operating time of the scavenging means is also short, the energy consumption required for scavenging is low. Using air as the scavenging gas enables a normally provided air compressor to be used as the scavenging means. Further, by operating this air compressor at a low speed, it is possible to obtain a small or extremely small amount of air, thereby further reducing the energy loss from scavenging.

A second aspect of the invention relates to a fuel cell system provided with a fuel cell which generates electricity by a chemical reaction between a fuel gas supplied to an anode side of the fuel cell and an oxidization gas supplied to a cathode side of the fuel cell; gas pressure detecting means for detecting a gas pressure of the fuel gas on the anode side of the fuel cell; closing means for closing off the anode side of the fuel cell when supply of the fuel gas and the oxidization gas to the fuel cell is stopped; and scavenging means for scavenging residual gas on the cathode side by supplying a scavenging gas to the cathode side when a gas pressure decrease amount of the fuel gas sealed on the anode side by the anode side being closed off by the closing means is larger than a reference value.

According to this structure, it is estimated whether there is a possibility that a chemical short is occurring from the amount of decrease in the sealed fuel gas. When there is a possibility that a chemical short is occurring, a scavenging gas (such as a small amount of air) is supplied for a short time to discharge hydrogen gas that leaked from the anode side to the cathode side outside of the fuel cell. As a result, it is possible to prevent a chemical short from occurring or stop a chemical short which is occurring. Also, because the operating time of the scavenging means is also short, the energy consumption required for scavenging is low. Using air for the scavenging gas enables an air compressor that is normally provided in the fuel cell system to be used as the scavenging means. Further, by operating this air compressor at a low speed, it is possible to obtain a small or extremely small amount of air, thereby further reducing the energy loss from scavenging.

A third aspect of the invention relates to a fuel cell system provided with a fuel cell which generates electricity by a chemical reaction between a fuel gas supplied to an anode side of the fuel cell and an oxidization gas supplied to a cathode side of the fuel cell; concentration detecting means for detecting a gas concentration of the oxidization gas on the cathode side; and scavenging means for scavenging residual gas on the cathode side by supplying a scavenging gas to the cathode side when the gas concentration of the oxidization gas remaining on the cathode side of the fuel cell falls below a reference value when supply of the fuel gas and the oxidization gas to the fuel cell is stopped.

According to this structure, it is estimated whether there is a possibility that a chemical short is occurring from a decrease in the gas concentration of residual oxidization gas. When there is a possibility that a chemical short is occurring, a scavenging gas (such as a small amount of air) is supplied for a short time to discharge hydrogen gas that leaked from the anode side to the cathode side outside of the fuel cell. As a result, it is possible to prevent a chemical short from occurring or stop a chemical short which is occurring. Also, because the operating time of the scavenging means is also short, the energy consumption required for scavenging is low. Using air for the scavenging gas enables a normally provided air compressor to be used as the scavenging means. Further, by operating this air compressor at a low speed, it is possible to obtain a small or extremely small amount of air, thereby further reducing the energy loss from scavenging.

A fourth aspect of the invention relates to a control method for a fuel cell system provided with a fuel cell that generates electricity by a chemical reaction between a fuel gas supplied to an anode side of the fuel cell and an oxidization gas supplied to a cathode side of the fuel cell. This control method estimates whether there is a possibility that a chemical short is occurring in the fuel cell when supply of the fuel gas and the oxidization gas to the fuel cell is stopped, and supplies a scavenging gas to the cathode side when it has been estimated that there is a possibility that the chemical short is occurring. The estimation of whether there is a possibility that the chemical short is occurring is made by monitoring, for example, a decrease tendency of the pressure of the fuel gas sealed on the anode side, or a decrease in the concentration of the oxidization gas on the cathode side, or the like.

Preferably, the fuel gas is hydrogen gas, the oxidization gas is air, and the scavenging gas is a small (or extremely small) amount of air. A small amount in this case refers to an amount that is small compared to the amount supplied during normal operation and depends on the specific structure of the system. For example, it may be an amount that is larger than the stoichiometric value of 0 and equal to, or less than, 1.

Preferably, once it has been determined that there is a fuel gas leak, that determination is made a second time to make sure that the result of the first determination was not incorrect. This increases the accuracy of the determination, making it possible to avoid problems such as an erroneous detection from a pressure sensor due to EMI (electromagnetic interference), for example.

Stopping operation of the fuel cell preferably includes stopping operation of the fuel cell in an intermittent operating state. Intermittent operation refers to an operating mode of the fuel cell in which operation of the fuel cell stops when a load on the fuel cell becomes low (in which case the fuel consumption efficiency decreases), and electricity is supplied to the load instead from a secondary battery that has been charged by the fuel cell until it becomes necessary to operate the fuel cell again. Intermittent operation makes it possible to use the fuel cell with good fuel consumption efficiency, thereby improving the operating efficiency of the fuel cell. When the fuel cell is being intermittently operated, the period during which operation of the fuel cell is stopped is used to determine whether there is a hydrogen gas leak, for example. The power to the load while the fuel cell is stopped is not limited to being supplied from the secondary battery. Alternatively, it may be supplied from a large-capacity capacitor or a commercial power source or the like.

Since the possibility of a chemical short is determined and scavenging is executed, an air compressor or the like is driven only to the extent necessary to prevent the chemical short or the like from occurring or stops a chemical short or the like which is occurring. Accordingly, unnecessary energy consumption from driving the air compressor or the like unnecessarily is minimized, thereby improving fuel consumption efficiency.

BRIEF DESCRIPTION OF THE DRAWINGS

The above-mentioned objects, features and advantages of the invention will become apparent from the following description of preferred embodiments with reference to the accompanying drawings, wherein like numerals are used to represent like elements and wherein.

DETAILED DESCRIPTION OF THE PREFERRED EMBODIMENTS

According to one exemplary embodiment of the invention, a determination is made as to whether a chemical short is occurring in the fuel cell while the fuel cell is stopped, e.g., while the fuel cell is stopped during intermittent operation or while it is forcibly stopped. For example, it is estimated whether there is a possibility that a chemical short is occurring based on the extent of a leak of hydrogen gas (i.e., fuel gas) sealed in the fuel cell or a decrease in the concentration of oxygen gas (i.e., oxidization gas) in the air remaining in the fuel cell. In order to prevent an erroneous determination of a hydrogen gas leak, after it has been determined that there is a leak once, the determination is made again.

Once it has been established that there is a good probability of a chemical short occurring, a small amount (or extremely small amount) of air as a scavenging gas is supplied into the cathode side of the fuel cell such that the hydrogen that leaked is exhausted (scavenged), together with the residual air, out of the fuel cell. By controlling the motor of the air compressor on and off (PWM control), the motor is operated at a lower speed than normal, making it possible to supply the extremely small amount of air to the air compressor. For example, when the motor of the air compressor is operating at the minimum stable speed, an air amount that is normally 350 [NL/min] is able to be reduced to 20 to 80 [NL/min].

When scavenging is performed using air, it is possible to both prevent a chemical short from occurring or stop a chemical short which is occurring and prevent thermal fatigue of a MEA (membrane electrode assembly) due to generated heat. It is also possible to prevent a decrease in voltage due to a delay in the supply of oxygen gas at the next startup.

In order to determine the possibility of a hydrogen gas leak at fixed intervals as described above, the fuel cell may also be stopped when the load on the fuel cell is equal to, or less than, a predetermined value regardless of whether the fuel cell is in an intermittent operating state. In this case, the required power can be provided from a secondary battery.

Figure 1:
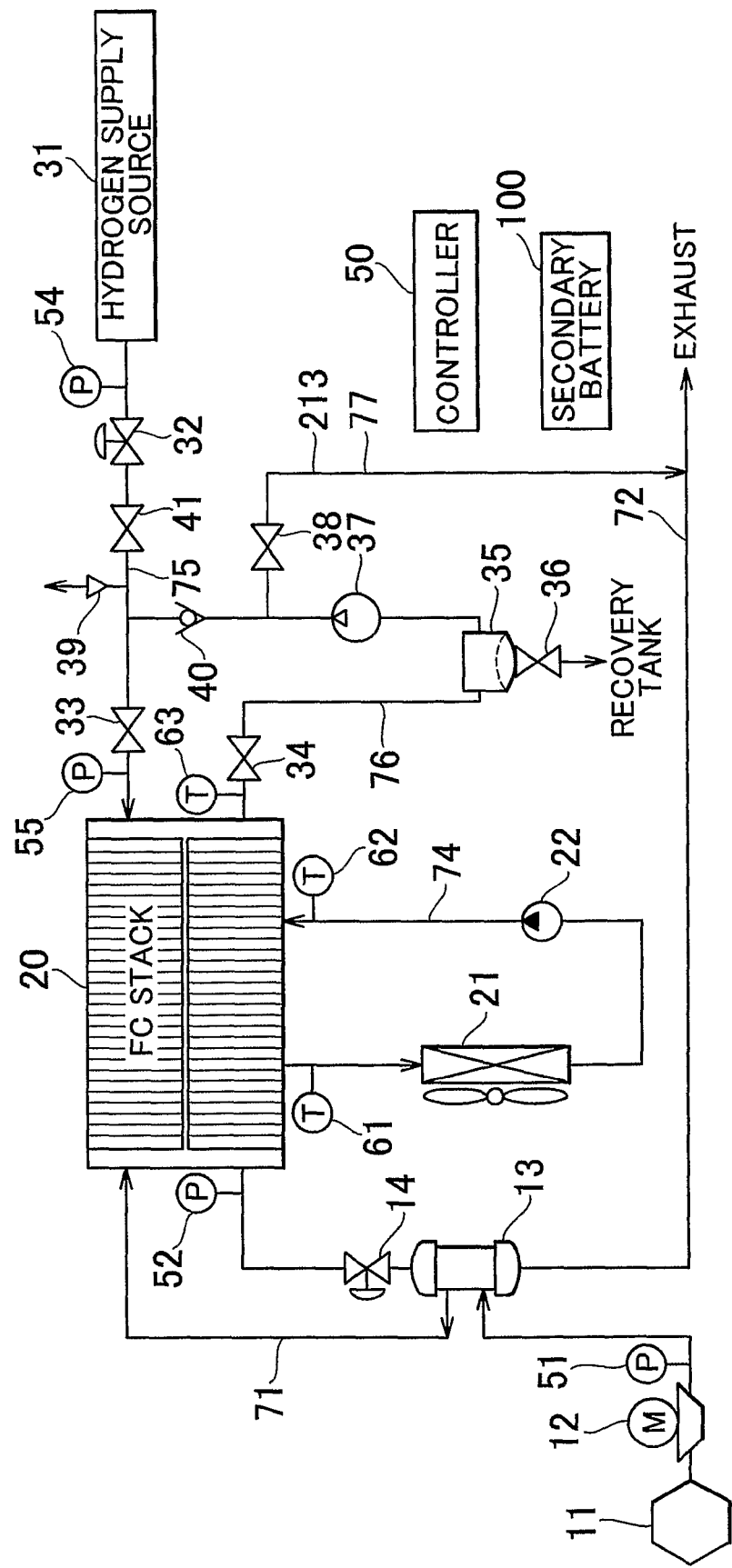
FIG. 1 is a block diagram of a fuel cell system according to a first exemplary embodiment of the invention.

A first exemplary embodiment of the invention is shown in FIG. 1. In this first exemplary embodiment, the anode gas pressure when operation of the fuel cell is stopped is monitored and it is estimated whether there is a possibility that a fuel gas leak to the cathode side or a chemical short is occurring based on a whether there is a decrease in the anode gas pressure. When there is a possibility that a chemical short is occurring, a small amount of gas (air) is supplied to the fuel cell to scavenge the residual gas to prevent the chemical short from occurring or stop a chemical short which is occurring. Also, fuel efficiency is improved as much as possible by operating the air compressor only when necessary to supply the small amount of gas to the fuel cell.

As shown in the drawing, air (outside air) as the oxidization gas is supplied to an air supply inlet of a fuel cell 20 via an air supply passage 71. In this air supply passage 71 are provided an air filter 11 that removes fine particles from the air, a compressor 12 that compresses the air, a pressure sensor 51 that detects the supply air pressure, and a humidifier 13 that adds the required amount of moisture to the air. The compressor 12 and a control program for a controller 50, to be described later, may be regarded as scavenging means. An air compressor capable of supplying a small amount of gas may also be provided separately as scavenging means. An airflow meter is also provided in the air filter 11 to detect the airflow.

Air off gas exhausted from the fuel cell 20 is discharged to the outside through an exhaust passage 72. In the exhaust passage 72 are provided a pressure sensor 52 that detects the exhaust pressure, a pressure regulating valve 14, and a heat exchanger of the humidifier 13. The pressure regulating valve (pressure decrease valve) 14 functions as a pressure governor that sets the pressure (air pressure) of the air supplied to the fuel cell 20. Detection signals, not shown, from the pressure sensors 51 and 52 are sent to the controller 50. The controller 50 then sets the supply air pressure and the supply air amount by regulating the compressor 12 and the pressure regulating valve 14.

Hydrogen gas as the fuel gas is then supplied to a hydrogen supply inlet of the fuel cell 20 from a hydrogen supply source 31 via a fuel supply passage 75. In this fuel supply passage 75 are provided a pressure sensor 54 that detects a pressure of the hydrogen supply source, a hydrogen regulating valve 32 that regulates the supply pressure of the hydrogen gas supplied to the fuel cell 20, a cut-off valve 41, a relief valve 39 that opens when there is abnormal pressure in the fuel supply passage 75, a cut-off valve 33, and a pressure sensor 55 that detects the inlet pressure of the hydrogen gas. The pressure sensor 55 may be regarded as gas pressure detecting means. Detection signals, not shown, from the pressure sensors 54 and 55 are supplied to the controller 50.

Hydrogen gas not consumed by the fuel cell 20 is exhausted to a hydrogen circulation passage 76 as hydrogen off gas, which is returned to the downstream side of the cut-valve 41 of the fuel supply passage 75. Provided in the hydrogen circulation passage 76 are a temperature sensor 63 that detects a temperature of the hydrogen off gas, a cut-off valve 34 that discharges the hydrogen off gas, a gas/liquid separator 35 that recovers moisture from the hydrogen off gas, a drain valve 36 that recovers the recovered water to a tank, not shown, a hydrogen pump 37 that pressurizes the hydrogen off gas, and a backflow prevention valve 40. The cut-off valves 33 and 34 may be regarded as closing means for closing off the anode side of the fuel cell. A detection signal, not shown, from the temperature sensor 63 is supplied to the controller 50. Operation of the hydrogen pump 37 is controlled by the controller 50. The hydrogen off gas combines with the hydrogen gas in the fuel supply passage 75, where it is supplied to the fuel cell 20 and reused. The backflow prevention valve 40 prevents the hydrogen gas in the fuel supply passage 75 from flowing back toward the hydrogen circulating passage 76.

The hydrogen circulation passage 76 is connected to the exhaust passage 72 by a purge flow passage 77 via a purge valve 38. The purge valve 38 is an electromagnetic cut-off valve which is operated in response to a command from the controller 50 to release (purge) hydrogen off gas to the outside. Intermittently performing this purge operation makes it possible to prevent the concentration of impurities in the hydrogen gas on the fuel electrode side from increasing due to repeated circulation of the hydrogen off gas, and therefore prevent the cell voltage from dropping.

Furthermore, a coolant passage 74 through which coolant is circulated is provided at a coolant inlet/outlet of the fuel cell 20. In this coolant passage 74 are provided a temperature sensor 61 that detects the temperature of the coolant discharged from the fuel cell 20, a radiator (heat exchanger) 21 that radiates the heat from the coolant to the outside, a pump 22 that pressurizes and circulates the coolant, and a temperature sensor 62 that detects the temperature of the coolant supplied to the fuel cell 20.

The controller 50 receives the required load indicated by accelerator signal of the vehicle and the like, not shown, as well as control information from the various sensors of the fuel cell system and the like, and controls the operation of the various valves and motors and the like accordingly. The controller 50 is a control computer system, not shown. This control computer system may be an available system that is well known.

Next, operation of the controller 50 will be described with reference to the flowchart shown in FIG. 2.

The controller 50 is a control computer, as described above, and executes control over the operation of the various parts of the fuel cell system in accordance with a control program, not shown.

First, the controller 50 stops operation of the fuel cell 20 when the load placed on the fuel cell 20 is low (in which case the power generating efficiency of the fuel cell 20 is low) and supplies power from the secondary battery 100. Also, when the state of charge (SOC) of the secondary battery 100 is low, the controller 50 also operates the fuel cell 20 to both supply power to the load and charge the secondary battery 100. When the charging of the secondary battery 100 is complete, the fuel cell 20 stops operating and the secondary battery 100 is used to supply power to the load. The controller 50 repeats this kind of intermittent operation whenever the load placed on the fuel cell 20 is low.

As described above, the controller 50 operates even when the fuel cell 20 is operating in the intermittent operating mode. Then when the fuel cell 20 is stopped and power is supplied by the secondary battery 100, a chemical short determining program shown in FIG. 2 is executed interrupting a separate program (step S20) at a predetermined cycle or when a specified event occurs.

First, the controller 50 stops the auxiliary devices such as the air compressor 12, the hydrogen pump 37, and the cut-off valve 41, and stops the supply of the hydrogen gas and the air (step S22). The controller 50 also operates the cut-off valves 33 and 34 to close off hydrogen gas flow passages 75 and 76 from the fuel cell 20, thereby sealing the hydrogen gas inside the fuel cell 20 (step S24). Step S24 and both the cut-off valves 33 and 34 can be regarded as the sealing means. After a predetermined period of time t0, during which the pressure fluctuation due to closing off the supply hydrogen gas subsides, has passed (step S26), an anode side hydrogen gas pressure P1 is read from the output of a pressure meter 55 (step S28). Then, after a determining period t1 appropriate for determining whether there is a cross leak of the hydrogen gas has passed (step S30), an anode side hydrogen gas pressure P2 is read from the output of the pressure meter 55 (step S32). A decrease amount $\Delta P = P1 - P2$ of the hydrogen gas pressure during the determining period t1 is then calculated (step S34).

Then it is determined whether this decrease amount ΔP is greater than a first determining reference value Ps of the cross leak obtained based on experimental results or computational expressions or the like (step S36). If the decrease amount ΔP of the hydrogen gas pressure does not exceed the first determining reference value Ps, it is determined that there is little movement (leak) of hydrogen gas to the hydrogen gas cathode (oxidization electrode) side (i.e., NO in step S36). In this case, a leak flag 1 is reset to OFF (step S40) because no problem has occurred due to a cross leak, and the determining program ends and the separate program that was interrupted continues from it left off (step S42). If, on the other hand, the decrease amount ΔP exceeds the first determining reference value Ps, the controller 50 determines that the movement (leak) of hydrogen gas to the hydrogen gas cathode (oxidization electrode) side is large (i.e., YES in step S36). In this case, the leak flag 1 is set to ON, which indicates the probability of a hydrogen leak (step S38). The determining program then ends and the separate program that was interrupted continues from it left off (step S42).

When the leak flag 1 is set to ON (step S38), the controller 50 can execute a second chemical short determining program (step S50) in order to make a more accurate determination. As a result, it is possible to confirm that a positive determination is not the result of an output error of the pressure meter 55 due to EMI (electromagnetic interference), for example.

First, in order to measure the hydrogen gas leak again, the controller 50 opens the cut-off valves 33 and 41 and supplies hydrogen gas to the anode side of the fuel cell 20 until the pressure reaches a pressure appropriate for measuring the leak (step S52). Next, the controller 50 closes the cut-off valves 33, 34, and 41 so as to seal the hydrogen gas inside the fuel cell 20. After confirming that the time t0, during which the gas pressure fluctuation has stabilized by shutting off the supply of hydrogen gas, has passed (step S56), the controller 50 reads the output P3 of the pressure meter 55 (step S58). Then after a determining period t2 appropriate for determining whether there is a cross leak of the hydrogen gas has passed (step S60), the controller 50 reads the anode side hydrogen gas pressure P4 from the output of the pressure meter 55 (step S52). The determining period t2 is set to be longer than the determining period t1. A decrease amount ΔP=P3−P4 of the hydrogen gas pressure during the determining period t2 is then calculated (step S64).

Then it is determined whether this decrease amount ΔP is greater than a second determining reference value Pt of the cross leak obtained based on experimental results or computational expressions or the like. The second determining reference value Pt is set to a value smaller than the first determining reference value Ps so the possibility of a leak can be determined more accurately (step S66).

If the decrease amount ΔP of the hydrogen gas pressure does not exceed the second determining reference value Pt, it is determined that there is little movement (leak) of hydrogen gas to the hydrogen gas cathode (oxidization electrode) side (i.e., NO in step S66). In this case, it is determined that the probability of a problem occurring from a cross leak is low so a leak flag 2 is reset to OFF (step S70), and the determining program ends and the separate program that was interrupted continues from it left off (step S72).

If, on the other hand, the decrease amount ΔP does exceed the second determining reference value Pt, then there is movement (a leak) of hydrogen gas to the hydrogen gas cathode (oxidization electrode) side so the controller 50 determines that it is highly probable that a chemical short is occurring as a result (i.e., YES in step S66). In this case, the leak flag 2 is set to ON which indicates a high probability of a hydrogen gas leak (step S68). The determining program then ends and the separate program that was interrupted continues from it left off (step S72).

When the leak flag 2 is set to ON, the controller 50 can alert the operator of the fuel cell vehicle or a person in charge of the fuel cell system by turning on a hydrogen leak warning indicator, not shown, and/or sounding an alarm.

Figure 4:
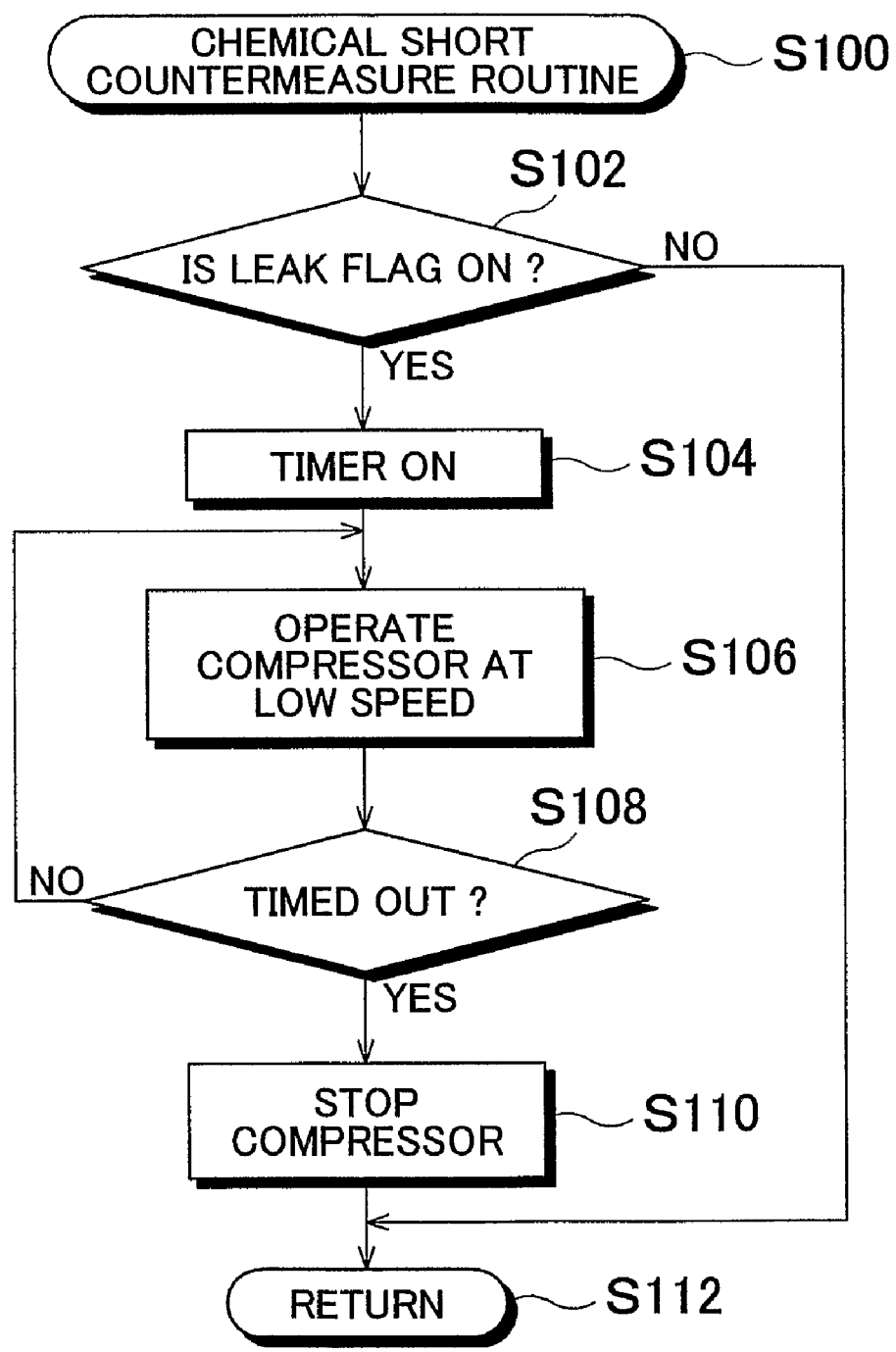
FIG. 4 is a flowchart of a countermeasure for a chemical short.

Further, the controller 50 can have a function (step S100), such as that shown in FIG. 4, to prevent or stop a chemical short caused by a direct reaction between hydrogen gas and oxygen gas, and can execute this function in response to the leak flag 2 being set to ON. Supplying an extremely small amount of air to the cathode side discharges any remaining hydrogen gas that leaked from the anode side to the cathode side outside.

When the leak flag 2 is set to ON (i.e., YES in step S102), the controller 50 starts a timer housed in the computer system, not shown. This timer sets the operating time of the air compressor (step S104). The controller 50 operates the air compressor 12 at a low speed so as to supply an extremely small amount (an even smaller amount than is supplied when the fuel cell generates power in an idle state) of air to the cathode side. As a result, any hydrogen gas remaining on the cathode side is exhausted, whereby the heat generated by the chemical short is cooled, reducing damage to the MEA (membrane electrolyte assembly). Further, water drops produced by the chemical short that had adhered to the MEA are released, thus activating the catalyst (step S106). Here, the amount of air supplied by the air compressor 12 is, for example, ¼ to ¹/₁₀ the normal amount, which is outside the normal operating range of the air compressor 12. Therefore, the speed of the motor of the air compressor 12 is adjusted by PWM (duty ratio) control, for example, so that the motor operates at a low speed, making it possible to supply the extremely small amount of air required.

When using the air compressor 12 which is capable of supplying a large amount of air, the lowest speed is still fast which means that more air than is necessary is supplied to the cathode, thus lowering efficiency. Therefore, a separate small-capacity air compressor may also be provided in addition to the air compressor 12, and that air compressor may be used. Steps S36, S66, and S106 may be regarded as the scavenging means.

Next, the controller 50 confirms the output flag of the timer (step S108). If a predetermined period of time has not passed (i.e., timed out) (i.e., NO in step S108), the air compressor 12 continues to be operated at a low speed. The controller 50 operates the air compressor 12 for the predetermined period of time and exhausts the residual hydrogen gas in the fuel cell 20 (steps S106 to S108).

When the predetermined period of time has passed (i.e., YES in step S108), the air compressor 12 or the separately provided small-capacity air compressor is stopped (step S110). The controller 50 then returns to the original control program (step S112). The leak flag which caused the chemical short countermeasure routine to be executed can be reset to OFF after that routine ends.

If the leak flag is set to ON again in the next chemical short determination, the chemical short countermeasure routine is executed again. If this is continually repeated, however, it may indicate an abnormality in the fuel cell 20 so a separate abnormality routine would be executed.

Figure 2:
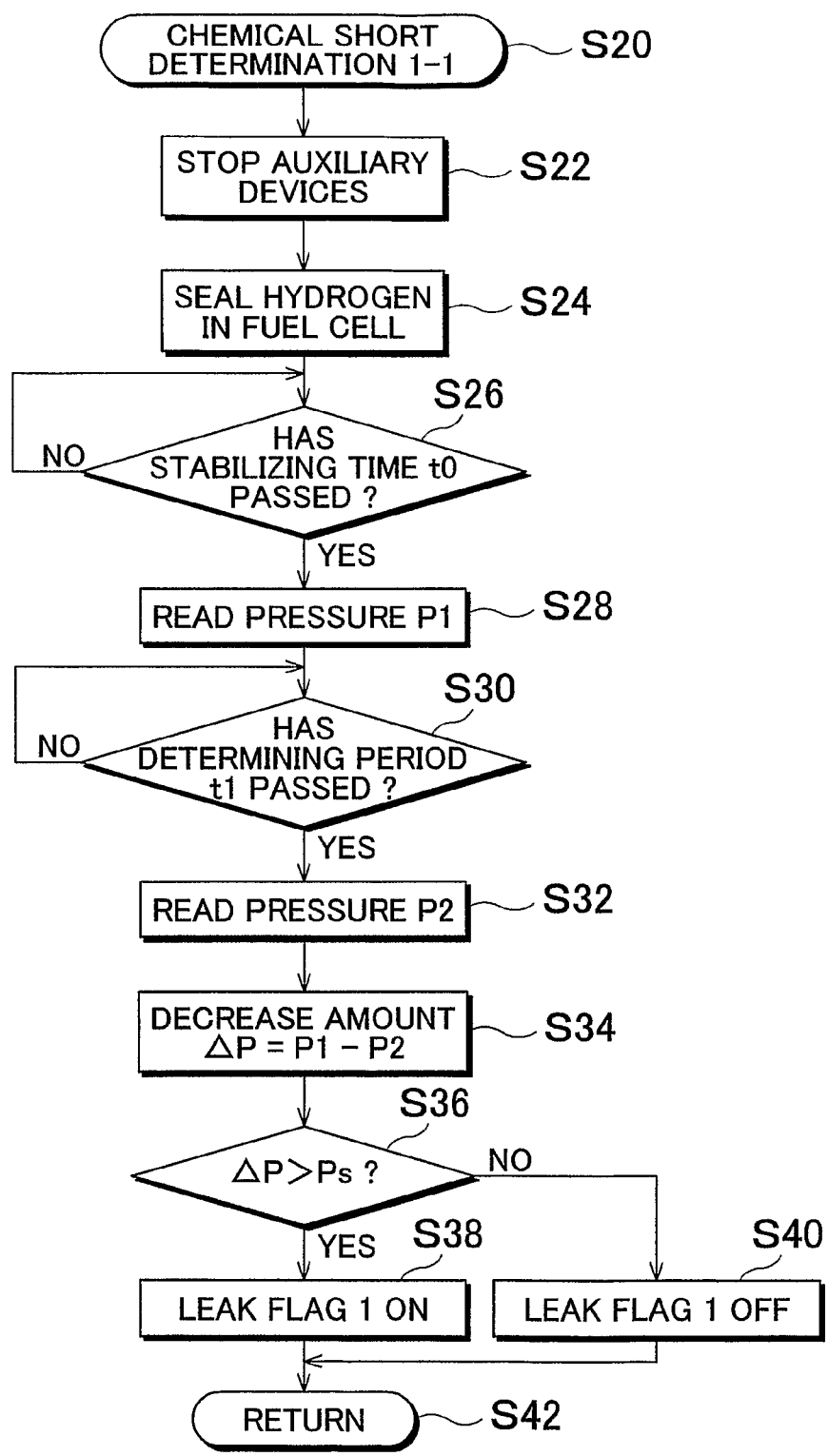
FIG. 2 is a flowchart of a first determination example for a chemical short.
Figure 3:
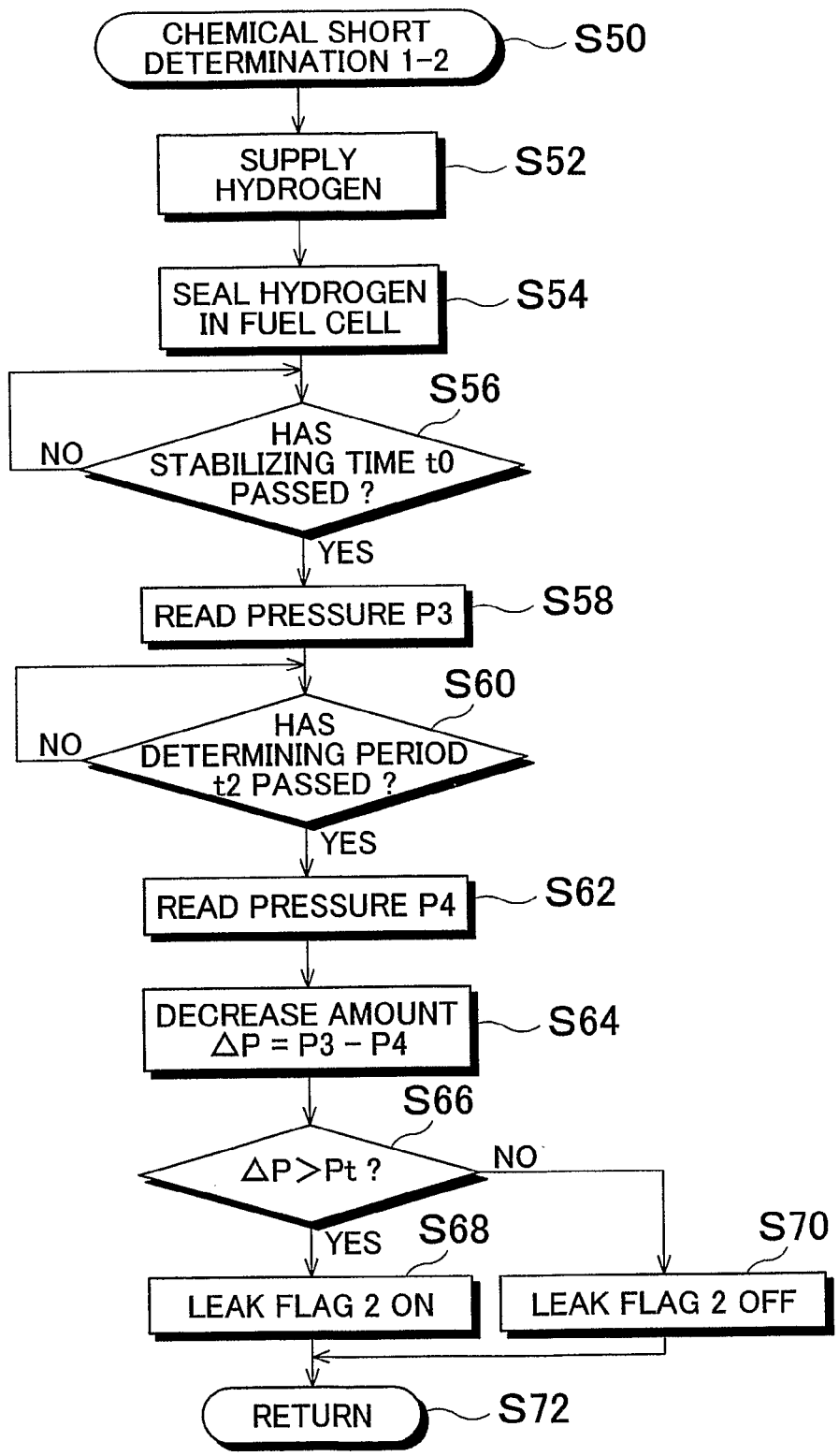
FIG. 3 is a flowchart of a second determination example for a chemical short.

Also, in the first exemplary embodiment, the occurrence of a chemical short is more reliably determined by the two determinations shown in FIGS. 2 and 3. Alternatively, however, the chemical short countermeasure routine (FIG. 4) may be executed after a chemical short has been determined by only the first chemical short determination shown in FIG. 2.

Figure 5:
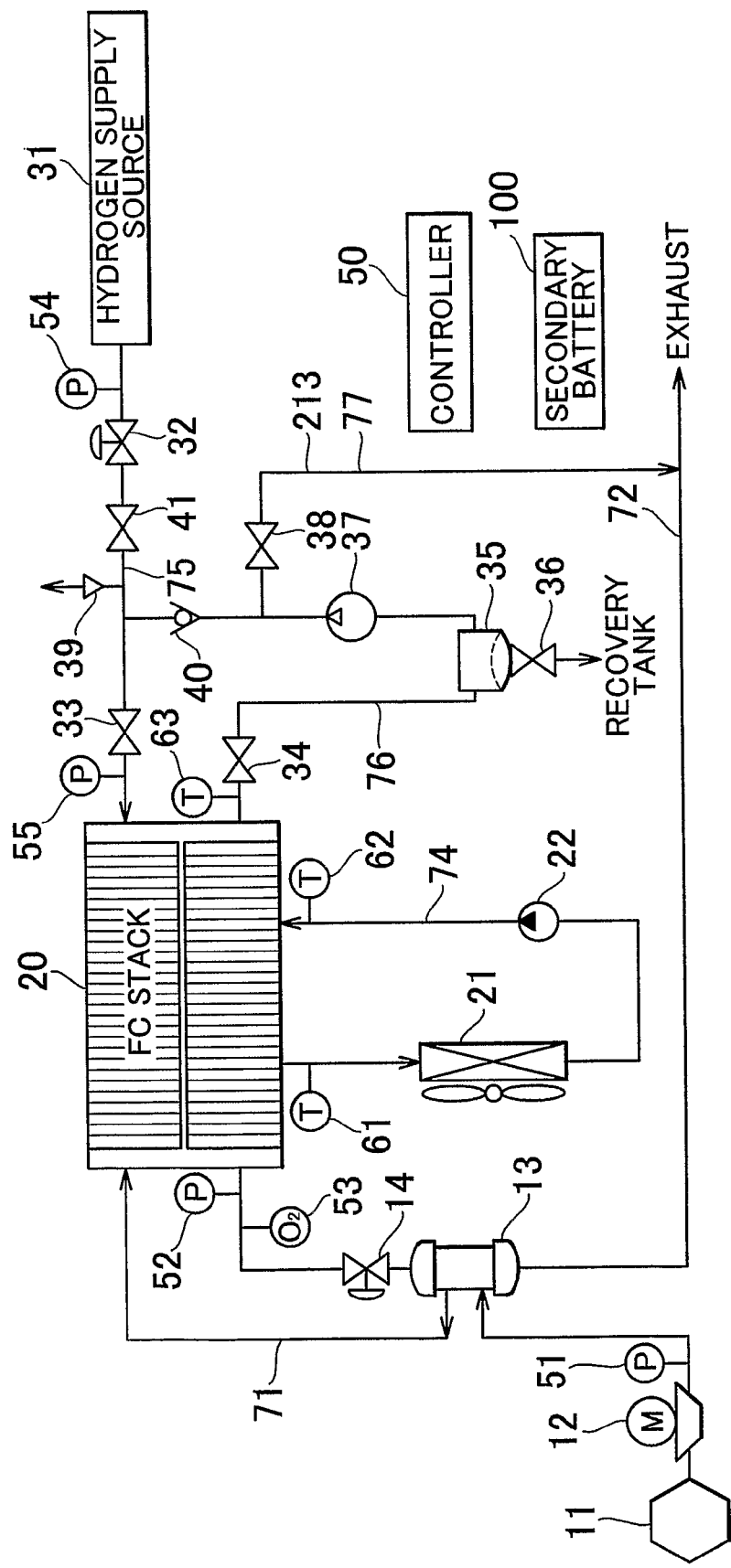
FIG. 5 is a block diagram of a fuel cell system according to a second exemplary embodiment of the invention.

A second exemplary embodiment of the invention is shown in FIG. 5. Those parts in FIG. 5 that correspond to parts in FIG. 1 will be referred to by the same reference numerals and described thereof will be omitted.

In the second exemplary embodiment, the oxygen concentration in the air off gas discharged from the fuel cell 20 is detected and it is determined whether there is a possibility that a chemical short is occurring. Therefore, an oxygen concentration sensor 53 is provided in the exhaust passage 72 near the air discharge outlet of the fuel cell 20, as shown in FIG. 2. The oxygen concentration sensor 53 detects the concentration of residual oxygen in the air off gas and sends the detection signal to the controller 50. The other structure is the same as that shown in FIG. 1.

Figure 6:
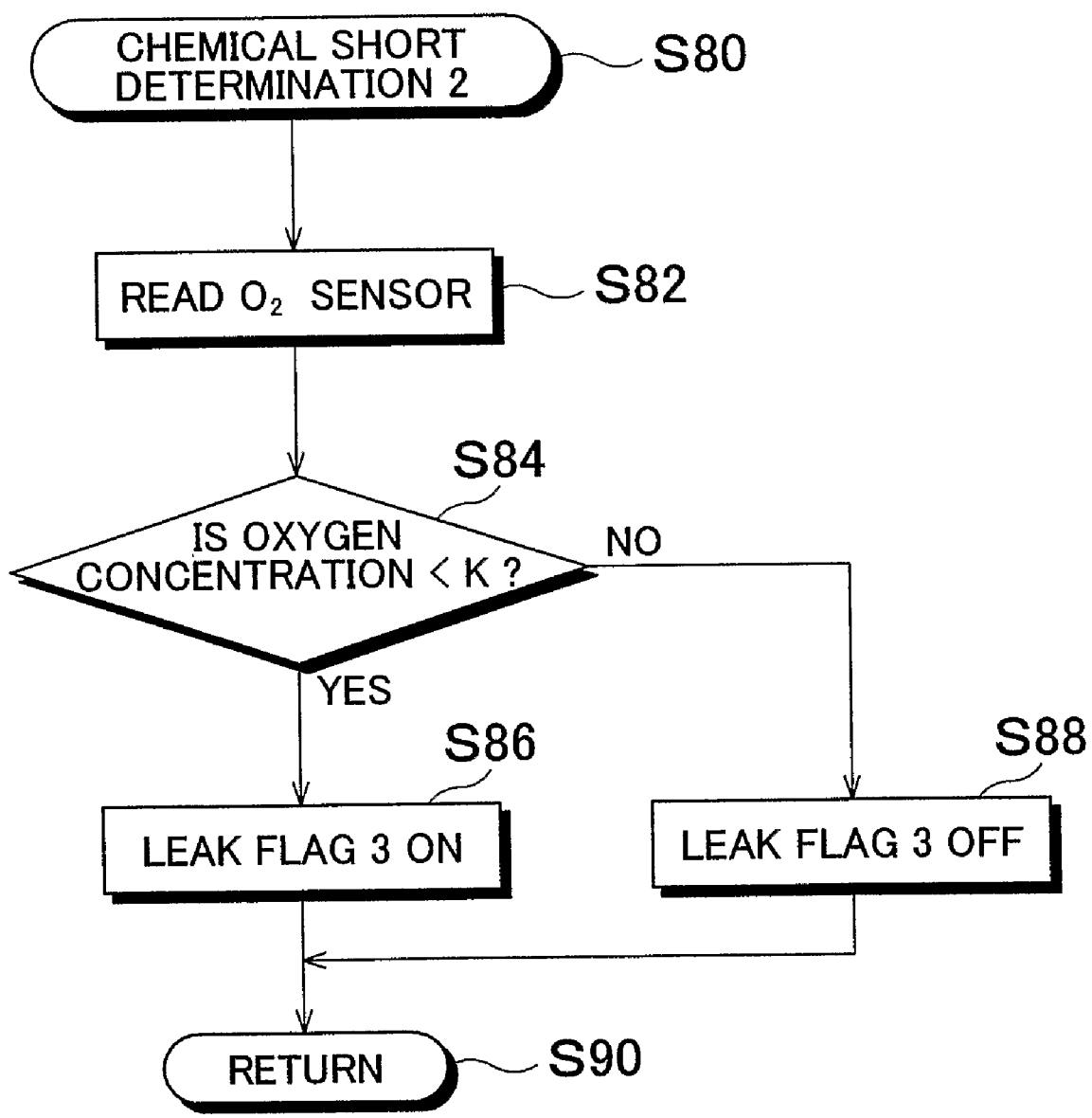
FIG. 6 is a flowchart of a third determination example for a chemical short.

Next, operation of the controller 50 will be described with reference to the flowchart shown in FIG. 6.

First, the controller 50 stops the operation of the fuel cell 20 when the load placed on the fuel cell 20 is low (in which case the power generating efficiency of the fuel cell 20 is low) and supplies power from the secondary battery 100. Also, when the state of charge (SOC) of the secondary battery 100 is low, the controller 50 also operates the fuel cell 20 to both supply power to the load and charge the secondary battery 100. When the charging of the secondary battery 100 is complete, the fuel cell 20 stops operating and the secondary battery 100 is used to supply power to the load. The controller 50 repeats this kind of intermittent operation of the fuel cell 20 whenever the load placed on the fuel cell 20 is low.

As described above, the controller 50 operates even when the fuel cell 20 is operated in the intermittent operating mode. Then when the fuel cell 20 is stopped and power is supplied by the secondary battery 100, a chemical short determining program shown in FIG. 6 is executed at a predetermined cycle or when a specified event occurs (step S80). During intermittent operation of the fuel cell 20, the controller 50 stops the auxiliary devices such as the air compressor 12 and the hydrogen pump 37, and stops the generation of power in the fuel cell 20, as described above. In this state, the residual oxygen gas concentration on the cathode side of the fuel cell 20 is constant. However, oxygen gas is consumed due to the hydrogen gas leaking from the anode side to the cathode side of the MEA, or a chemical short occurring as a result of such a leak. As a result, the oxygen gas concentration in the air remaining on the cathode side decreases. The controller 50 detects the oxygen gas concentration in the residual air by the output from the oxygen concentration sensor 53 (step S82).

Then it is determined whether this oxygen gas concentration is less than a reference value K obtained by experiment or computational expressions or the like beforehand (step S84). If the oxygen gas concentration is below the reference value K (i.e., YES in step S84), then it is determined that there is a (good) possibility that a chemical short is occurring so a leak flag 3 is set to ON (step S86). If, on the other hand, the oxygen gas concentration is larger than the reference value K (i.e., NO in step S84), the controller 50 determines that there is no hydrogen gas leak and resets the leak flag 3 to OFF (step S88). After the leak flag 3 is set or reset, the controller 50 ends this determining routine and returns to the original control program.

The chemical short countermeasure routine (see FIG. 4) is executed in response to the results of this chemical short determination.

Instead of detecting the oxygen gas concentration with the oxygen concentration sensor 53 described above, the amount of oxygen gas consumed may be calculated (estimated) by the controller 50 from the pressure decrease in the hydrogen gas at the anode described in the first exemplary embodiment, and the air may be scavenged on the cathode side when the oxygen gas decreases a predetermined amount.

In this way, when it is probable (or when the probability is high) that a chemical short is occurring during intermittent operation of the fuel cell 20, supplying a small amount of air to the fuel cell 20 makes it possible to prevent a chemical short from occurring or stop a chemical short which is occurring, while only using the air compressor 12 to the extent necessary makes it possible to improve energy efficiency.

The invention claimed is:

1. A fuel cell system comprising:
a fuel cell which generates electricity by a chemical reaction between a fuel gas supplied to an anode side of the fuel cell and an oxidization gas supplied to a cathode side of the fuel cell;
a controller programmed to determine whether there is a possibility that a chemical short is occurring in the fuel cell when supply of the fuel gas and the oxidization gas to the fuel cell is stopped; and
scavenging means for supplying a scavenging gas to the cathode side when it has been determined that there is a possibility that the chemical short is occurring,
wherein the controller communicates with:
gas pressure detecting means for detecting a gas pressure of the fuel gas on the anode side of the fuel cell,
closing means for closing off the anode side of the fuel cell when supply of the fuel gas and the oxidization gas to the fuel cell is stopped,
gas pressure decrease amount obtaining means for obtaining a gas pressure decrease amount of the fuel gas sealed on the anode side by the anode side being closed off by the closing means,
concentration determining means for determining a concentration of the oxidization gas on the cathode side,
wherein the controller determines that there is a possibility that the chemical short is occurring when the concentration of the oxidization gas is less than a first reference value,
wherein, when it has been determined that there is a possibility that the chemical short is occurring, the controller determines again whether there is a possibility that the chemical short is occurring by determining the concentration of the oxidization gas on the cathode side and determining whether the concentration of the oxidization gas on the cathode side is less than a second reference value that is set to a value larger than the first reference value; and
wherein the scavenging means supplies the scavenging gas to the cathode side when the concentration of the oxidization gas on the cathode side is less than the second reference value.

2. The fuel cell system according to claim 1, wherein the gas pressure decrease amount obtaining means detects a first gas pressure of the fuel gas sealed on the anode side after a first predetermined period of time has passed after the anode side of the fuel cell is closed off, and detects a second gas pressure of the fuel gas sealed on the anode side after a second predetermined period of time has passed after the first gas pressure is detected, and obtains a difference between the first gas pressure and the second gas pressure as the gas pressure decrease amount.

3. The fuel cell system according to claim 1, wherein the fuel gas is hydrogen gas, the oxidization gas is air, and the scavenging gas is a small amount of air.

4. The fuel cell system according to claim 1, wherein the scavenging means supplies to the cathode side an amount of the oxidization gas that is less than the amount of the oxidization gas supplied to the cathode side when the fuel cell is idling, when it has been determined that there is a possibility that the chemical short is occurring.

5. The fuel cell system according to claim 2, wherein the controller sets the second predetermined period of time longer than a predetermined period of time when it has been determined again that there is a possibility that the chemical short is occurring.

6. A control method for a fuel cell system provided with a fuel cell that generates electricity by a chemical reaction between a fuel gas supplied to an anode side of the fuel cell and an oxidization gas supplied to a cathode side of the fuel cell, comprising:
   determining whether there is a possibility that a chemical short is occurring in the fuel cell when supply of the fuel gas and the oxidization gas to the fuel cell is stopped; and
   supplying a scavenging gas to the cathode side when it has been determined that there is a possibility that the chemical short is occurring,
   wherein the determining whether there is the possibility that the chemical short is occurring includes:
      detecting a gas pressure of the fuel gas on the anode side of the fuel cell,
      obtaining, by the detection, a gas pressure decrease amount of the fuel gas sealed on the anode side by the anode side being closed off,
      determining a concentration of the oxidization gas on the cathode side, and
      determining the possibility that the chemical short is occurring when the determined concentration is less than a first reference value,
   wherein, when it has been determined that there is the possibility that the chemical short is occurring, it is determined again whether there is a possibility that the chemical short is occurring by determining the concentration of the oxidization gas on the cathode side and determining whether the concentration of the oxidization gas on the cathode side is less than a second reference value that is set to a value larger than the first reference value; and
   wherein the scavenging gas is supplied again to the cathode side when the concentration of the oxidization gas on the cathode side is less than the second reference value.

7. The control method for a fuel cell system according to claim 6, wherein the detecting a gas pressure detects a first gas pressure of the fuel gas sealed on the anode side after a first predetermined period of time has passed after the anode side of the fuel cell is closed off, and detects a second gas pressure of the fuel gas sealed on the anode side after a second predetermined period of time has passed after the first gas pressure is detected, and obtains a difference between the first gas pressure and the second gas pressure as the gas pressure decrease amount.

8. The control method for a fuel cell system according to claim 6, wherein the fuel gas is hydrogen gas, the oxidization gas is air, and the scavenging gas is a small amount of air.

9. The control method for a fuel cell system according to claim 6, wherein the supplying a scavenging gas supplies to the cathode side an amount of the oxidization gas that is less than an amount of the oxidization gas supplied to the cathode side when the fuel cell is idling, when it has been determined that there is a possibility that the chemical short is occurring.

10. The control method according to claim 7, wherein the determining whether there is a possibility that a chemical short is occurring sets the second predetermined period of time longer than a predetermined period of time when it has been determined again that there is a possibility that the chemical short is occurring.

11. A fuel cell system comprising:
   a fuel cell which generates electricity by a chemical reaction between a fuel gas supplied to an anode side of the fuel cell and an oxidization gas supplied to a cathode side of the fuel cell;
   a controller programmed to determine whether there is a possibility that a chemical short is occurring in the fuel cell when supply of the fuel gas and the oxidization gas to the fuel cell is stopped; and
   scavenging means for supplying a scavenging gas to the cathode side when it has been determined that there is a possibility that the chemical short is occurring,
   wherein the controller communicates with:
      gas pressure detecting means for detecting a gas pressure of the fuel gas on the anode side of the fuel cell,
      closing means for closing off the anode side of the fuel cell when supply of the fuel gas and the oxidization gas to the fuel cell is stopped,
      gas pressure decrease amount obtaining means for obtaining a gas pressure decrease amount of the fuel gas sealed on the anode side by the anode side being closed off by the closing means,
   wherein the controller determines that there is a possibility that the chemical short is occurring when the gas pressure decrease amount of the fuel gas sealed on the anode side is greater than a first reference value,
   wherein, when it has been determined that there is a possibility that the chemical short is occurring, the controller determines again whether there is a possibility that the chemical short is occurring by calculating the gas pressure decrease amount of the fuel gas sealed on the anode side and determining whether the gas pressure decrease amount of the fuel gas sealed on the anode side is greater than a second reference value that is set to a value less than the first reference value; and
   wherein the scavenging means supplies the scavenging gas to the cathode side when the gas pressure decrease amount of the fuel gas sealed on the anode side is greater than the second reference value.

12. A control method for a fuel cell system provided with a fuel cell that generates electricity by a chemical reaction between a fuel gas supplied to an anode side of the fuel cell and an oxidization gas supplied to a cathode side of the fuel cell, comprising:
   determining whether there is a possibility that a chemical short is occurring in the fuel cell when supply of the fuel gas and the oxidization gas to the fuel cell is stopped; and
   supplying a scavenging gas to the cathode side when it has been determined that there is a possibility that the chemical short is occurring,
   wherein the determining whether there is the possibility that the chemical short is occurring includes:
      detecting a gas pressure of the fuel gas on the anode side of the fuel cell,
      obtaining, by the detection, a gas pressure decrease amount of the fuel gas sealed on the anode side by the anode side being closed off,
      determining the possibility that the chemical short is occurring when the determined gas pressure decrease amount is greater than a first reference value,
   wherein, when it has been determined that there is a possibility that the chemical short is occurring, the controller determines again whether there is a possibility that the chemical short is occurring by calculating the gas pressure decrease amount of the fuel gas sealed on the anode side and determining whether the gas pressure decrease amount of the fuel gas sealed on the anode side is greater than a second reference value that is set to a value less than the first reference value; and wherein the scavenging gas is supplied again to the cathode side when the gas pressure decrease amount of the fuel gas sealed on the anode side is greater than the second reference value.

* * * * *